(12) United States Patent
Querci et al.

(10) Patent No.: US 8,722,824 B2
(45) Date of Patent: May 13, 2014

(54) RELATIVE PERMEABILITY MODIFIERS BASED ON HYDROPHOBICALLY MODIFIED CATIONIC COPOLYMERS

(75) Inventors: Cecilia Querci, Novara (IT); Matteo Russo, Cerano (IT); Riccardo Po', Novara (IT); Maria Anna Cardaci, Gerenzago (IT)

(73) Assignee: ENI S.p.A., Rome (IT)

( * ) Notice: Subject to any disclaimer, the term of this patent is extended or adjusted under 35 U.S.C. 154(b) by 15 days.

(21) Appl. No.: 13/139,737

(22) PCT Filed: Dec. 10, 2009

(86) PCT No.: PCT/EP2009/008860
§ 371 (c)(1),
(2), (4) Date: Aug. 23, 2011

(87) PCT Pub. No.: WO2010/069514
PCT Pub. Date: Jun. 24, 2010

(65) Prior Publication Data
US 2012/0130037 A1    May 24, 2012

(30) Foreign Application Priority Data
Dec. 16, 2008  (IT) .............................. MI2008A2228

(51) Int. Cl.
*C08F 236/20* (2006.01)
*C08F 220/60* (2006.01)
*C08F 226/06* (2006.01)

(52) U.S. Cl.
USPC .... 526/263; 526/295; 526/292.95; 526/303.1

(58) Field of Classification Search
USPC ....................................................... 526/303.1
See application file for complete search history.

(56) References Cited

U.S. PATENT DOCUMENTS 5,703,188 A * 12/1997 Mandeville et al. .......... 526/290

FOREIGN PATENT DOCUMENTS

GB        1 173 522       12/1969

OTHER PUBLICATIONS

International Search Report Issued Mar. 29, 2010 in PCT/EP09/008860 filed Dec. 10, 2009.

\* cited by examiner

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

Copolymers of acrylamide or methacrylamide, suitably modified with appropriate percentages of units deriving from comonomers of a hydrophobic nature and comonomers containing a positively charged ionic group, which are capable of effectively reducing the water permeability of a porous medium.

5 Claims, No Drawings

RELATIVE PERMEABILITY MODIFIERS BASED ON HYDROPHOBICALLY MODIFIED CATIONIC COPOLYMERS

The present invention relates to a class of hydrophobically modified polyacrylamides.

More specifically, the present invention relates to acrylamide or methacrylamide copolymers, suitably modified with appropriate percentages of units deriving from comonomers of a hydrophobic nature and comonomers containing a positively charged ionic group, which are capable of effectively reducing the water permeability of a porous medium such as soil and rocks.

The polymers of the present invention are new, as polymers containing at the same time hydrophobic and cationic groups for the application indicated, are not described in polymer literature.

An object of the present invention therefore relates to (meth)acrylamide copolymers having the general structure

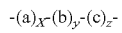

better represented by general formula (I):

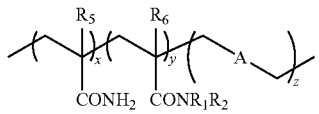

wherein $R_1$ and $R_2$, equal to or different from one another, represent a hydrogen radical or $C_1$-$C_{22}$ alkyl radicals, with the proviso that the sum of the carbon atoms of the two groups $R_1$ and $R_2$ be comprised between 8 and 32; x, y and z represent the percentages of the three units inside the polymeric chain deriving from three comonomers (a), (b) and (c); the unit A is chosen so as to represent the copolymer of general formula (I) according to one of the three following situations:

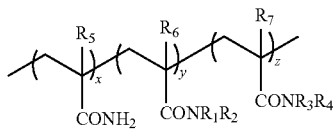

where $R_5$, $R_6$ and $R_7$, equal to or different from one another, represent a hydrogen or methyl radical;

$R_3$ and $R_4$, equal to or different from one another, represent a hydrogen radical, a $C_1$-$C_{20}$ alkyl radical, a $C_4$-$C_{20}$ hydrocarbon radical, linear or branched, containing a quaternary ammonium group; one between $R_3$ or $R_4$ has the structure:

where $R_8$ represents a $C_2$-$C_6$, optionally branched, alkylene radical, and $R_9$, $R_{10}$, $R_{11}$, equal to or different from one another, are $C_1$-$C_4$ alkyl radicals; alternatively $R_3$ and $R_4$ are bonded together and form a 6-membered cycle containing a quaternary nitrogen of formula:

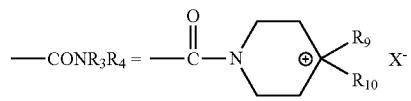

where $R_9$ and $R_{10}$, equal to or different from one another, are $C_1$-$C_4$ alkyl radicals and X is an organic or inorganic monovalent anion preferably chosen from halides, tetrafluoroborate, hexafluorophosphate, methylsulfate, trifluoromethanesulfonate, benzenesulfonate, p-toluenesulfonate, perchlorate and nitrate;

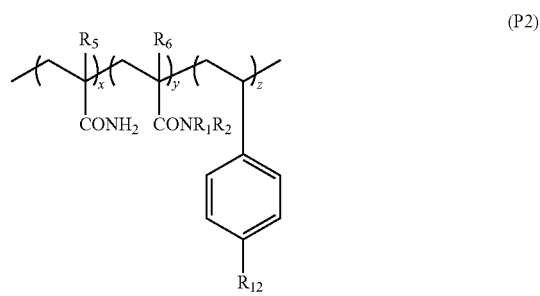

where $R_1$, $R_2$, $R_5$ and $R_6$ have the previous meaning, $R_{12}$ represents a $C_1$-$C_{20}$ alkyl radical containing an ammonium group chosen from methyl(trimethylammonium), methyl(triethylammonium), ethyl(trimethylammonium), ethyl(triethylammonium), etc, with a counter-ion preferably chosen from halides, tetrafluoroborate, hexafluorophosphate, methylsulfate, trifluoromethanesulfonate, benzenesulfonate, p-toluenesulfonate, perchlorate and nitrate;

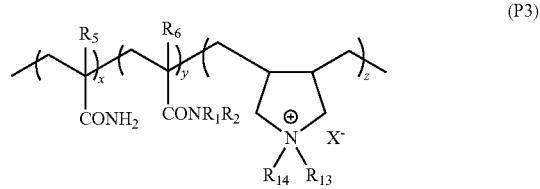

where $R_1$, $R_2$, $R_5$ and $R_6$ have the previous meaning, $R_{13}$ and $R_{14}$, equal to or different from one another, are $C_1$-$C_4$ alkyl radicals and X is preferably a halide ion, tetra-trifluoromethanesulfonate, benzenesulfonate, toluenesulfonate, perchlorate and nitrate.

Preferred polymers having general formula (I) are those in which unit A generates the situation (P1) wherein $R_3$ is a hydrogen and $R_4$ is —$R_8$—$N(R_9R_{10}R_{11})^+X^-$ wherein $R_8$ represents a $C_2$-$C_6$, optionally branched, alkylene radical, and $R_9$, $R_{10}$, $R_{11}$, equal to or different from one another, are methyl or ethyl radicals; X is an organic or inorganic monovalent anion selected from chloride and methylsulfate.

According to the present invention, the indexes x, y and z are such that, if the sum of x+y+z is equal to 100, y is within the range of 0.05 to 2, preferably from 0.2 to 1.2, and z ranges from 1 to 30, preferably from 1 to 10.

Once the HC parameter has been defined as a product of the percentage y of monomeric unit deriving from the comonomer (b) for the total number of carbon atoms CR of the residues $R_1$ and $R_2$, HC=y·CR, HC ranges from 0.4 to 64, preferably from 1.6 to 38.4, even more preferably from 4 to 16.

Examples of monomers (b) are the following:
N-octylacrylamide
N-octylmethacrylamide
N-decylacrylamide
N-decylmethacrylamide
N-dodecylacrylamide
N-dodecylmethacrylamide
N-tetradecylacrylamide
N-tetradecylmethacrylamide
N-hexadecylacrylamide
N-hexadecylmethacrylamide
N,N-dihexylacrylamide
N,N-dihexylmethacrylamide
N,N-dioctylacrylamide
N,N-dioctylmethacrylamide
N,N-didodecylacrylamide
N,N-didodecylmethacrylamide
N,N-dihexadecylacrylamide
N,N-dihexadecylmethacrylamide
N-ethyl-N-hexylacrylamide
N-ethyl-N-hexylmethacrylamide
N-ethyl-N-octylacrylamide
N-ethyl-N-octylmethacrylamide
N-ethyl-N-dodecylacrylamide
N-ethyl-N-dodecylmethacrylamide
N-ethyl-N-hexadecylacrylamide
N-ethyl-N-hexadecylmethacrylamide
N-butyl-N-hexylacrylamide
N-butyl-N-hexylmethacrylamide
N-butyl-N-octylacrylamide
N-butyl-N-octylmethacrylamide
N-butyl-N-dodecylacrylamide
N-butyl-N-dodecylmethacrylamide
N-butyl-N-hexadecylacrylamide
N-butyl-N-hexadecylmethacrylamide
N-(2-ethylhexyl)acrylamide
N-(2-ethylhexyl)methacrylamide
N-(2-hexyldecyl)acrylamide
N-(2-hexyldecyl)methacrylamide Examples of ionic monomers (c) capable of generating the situation (P1) are:
N-(2-methacrylamidoethyl)-N,N,N-trimethylammonium chloride
N-(3-methacrylamidopropyl)-N,N,N-trimethylammonium bromide
N-(4-methacrylamidobutyl)-N,N,N-trimethylammonium methylsulfate
N-(2-methacrylamidopropyl)-N,N,N-trimethylammonium chloride
N-(2-methacrylamido-1-methylethyl)-N,N,N-trimethylammonium bromide
N-(3-methacrylamidobutyl)-N,N,N-trimethylammonium methylsulfate
N-(3-methacrylamido-2-methylpropyl)-N,N,N-trimethylammonium chloride
N-(3-methacrylamido-1-methylpropyl)-N,N,N-trimethylammonium bromide
N-(3-methacrylamidopentyl)-N,N,N-trimethylammonium methylsulfate
N-(3-methacrylamido-3-methylbutyl)-N,N,N-trimethylammonium chloride
N-(3-methacrylamido-2,2-dimethylpropyl)-N,N,N-trimethylammonium bromide
N-(2-acrylamidoethyl)-N,N,N-trimethylammonium methylsulfate
N-(3-acrylamidopropyl)-N,N,N-trimethylammonium chloride
N-(4-acrylamidobutyl)-N,N,N-trimethylammonium bromide
N-(2-acrylamidopropyl)-N,N,N-trimethylammonium methylsulfate
N-(2-acrylamido-1-methylethyl)-N,N,N-trimethylammonium chloride
N-(3-acrylamidobutyl)-N,N,N-trimethylammonium bromide
N-(3-acrylamido-2-methylpropyl)-N,N,N-trimethylammonium methylsulfate
N-(3-acrylamido-1-methylpropyl)-N,N,N-trimethylammonium chloride
N-(3-acrylamidopentyl)-N,N,N-trimethylammonium bromide
N-(3-acrylamido-3-methylbutyl)-N,N,N-trimethylammonium methylsulfate
N-(3-acrylamido-2,2-dimethylpropyl)-N,N,N-trimethylammonium chloride
N-(2-methacrylamidoethyl)-N,N,N-triethylammonium bromide
N-(3-methacrylamidopropyl)-N,N,N-triethylammonium methylsulfate
N-(4-methacrylamidobutyl)-N,N,N-triethylammonium chloride
N-(2-methacrylamidopropyl)-N,N,N-triethylammonium bromide
N-(2-methacrylamido-1-methylethyl)-N,N,N-triethylammonium methylsulfate
N-(3-methacrylamidobutyl)-N,N,N-triethylammonium chloride
N-(3-methacrylamido-2-methylpropyl)-N,N,N-triethylammonium bromide
N-(3-methacrylamido-1-methylpropyl)-N,N,N-triethylammonium methylsulfate
N-(3-methacrylamidopentyl)-N,N,N-triethylammonium chloride
N-(3-methacrylamido-3-methylbutyl)-N,N,N-triethylammonium bromide
N-(3-methacrylamido-2,2-dimethylpropyl)-N,N,N-triethylammonium methylsulfate
N-(2-acrylamidoethyl)-N,N,N-triethylammonium chloride
N-(3-acrylamidopropyl)-N,N,N-triethylammonium bromide
N-(4-acrylamidobutyl)-N,N,N-triethylammonium methylsulfate
N-(2-acrylamidopropyl)-N,N,N-triethylammonium chloride
N-(2-acrylamido-1-methylethyl)-N,N,N-triethylammonium bromide
N-(3-acrylamidobutyl)-N,N,N-triethylammonium methylsulfate
N-(3-acrylamido-2-methylpropyl)-N,N,N-triethylammonium chloride
N-(3-acrylamido-1-methylpropyl)-N,N,N-triethylammonium bromide
N-(3-acrylamidopentyl)-N,N,N-triethylammonium methylsulfate
N-(3-acrylamido-3-methylbutyl)-N,N,N-triethylammonium chloride
N-(3-acrylamido-2,2-dimethylpropyl)-N,N,N-triethylammonium bromide
N-(2-methacrylamidoethyl)-N,N-dimethyl-N-ethylammonium methylsulfate
N-(3-methacrylamidopropyl)-N,N-dimethyl-N-ethylammonium chloride
N-(4-methacrylamidobutyl)-N,N-dimethyl-N-ethylammonium bromide
N-(2-methacrylamidopropyl)-N,N-dimethyl-N-ethylammonium methylsulfate N-(2-methacrylamido-1-methylethyl)-N,N-dimethyl-N-ethylammonium chloride
N-(3-methacrylamidobutyl)-N,N-dimethyl-N-ethylammonium bromide
N-(3-methacrylamido-2-methylpropyl)-N,N-dimethyl-N-ethylammonium methylsulfate
N-(3-methacrylamido-1-methylpropyl)-N,N-dimethyl-N-ethylammonium chloride
N-(3-methacrylamidopentyl)-N,N-dimethyl-N-ethylammonium bromide
N-(3-methacrylamideo-3-methylbutyl)-N,N-dimethyl-N-ethylammonium methylsulfate
N-(3-methacrylammido-2,2-dimethylpropyl)-N,N-dimethyl-N-ethylammonium chloride
N-(2-acrylamidoethyl)-N,N-dimethyl-N-ethylammonium bromide
N-(3-acrylamidopropyl)-N,N-dimethyl-N-ethylammonium methylsulfate
N-(4-acrylamidobutyl)-N,N-dimethyl-N-ethylammonium chloride
N-(2-acrylamidopropyl)-N,N-dimethyl-N-ethylammonium bromide
N-(2-acrylamido-1-methylethyl)-N,N-dimethyl-N-ethylammonium methylsulfate
N-(3-acrylamidobutyl)-N,N-dimethyl-N-ethylammonium chloride
N-(3-acrylamido-2-methylpropyl)-N,N-dimethyl-N-ethylammonium bromide
N-(3-acrylamido-1-methylpropyl)-N,N-dimethyl-N-ethylammonium methylsulfate
N-(3-acrylamidopentyl)-N,N-dimethyl-N-ethylammonium chloride
N-(3-acrylamido-3-methylbutyl)-N,N-dimethyl-N-ethylammonium bromide
N-(3-acrylamido-2,2-dimethylpropyl)-N,N-dimethyl-N-ethylammonium methylsulfate Examples of ionic monomers (c) capable of generating the situation (P2) are:
Vinylbenzyltrithethylammonium chloride
Vinylbenzyltrimethylammonium bromide
Vinylbenzyltriethylammonium chloride
Vinylbenzyltriethylammonium bromide Examples of ionic monomers (c) capable of generating the situation (P3) are:
N,N-diallyl-N,N-dimethylammonium chloride
N,N-diallyl-N,N-dimethylammonium bromide
N,N-diallyl-N,N-diethylammonium chloride
N,N-diallyl-N,N-diethylammonium bromide
N,N-diallyl-N,N-dipropylammonium chloride
N,N-diallyl-N,N-dipropylammonium bromide
N,N-diallyl-N,N-dibutylammonium chloride
N,N-diallyl-N,N-dibutylammonium bromide
N,N-diallyl-N,N-dibenzylammonium chloride Some applicative and non-limiting examples are provided hereunder for a better understanding of the present invention and for its embodiment.

In the examples, the deionized water was deaerated by nitrogen bubbling (90 minutes) before each polymerization test.

The following reagents were used, without any preliminary treatment:
acrylamide, 99% (Fluka);
(2-methacrylamidopropyl)trimethylammonium chloride, aqueous solution at 50% (Polysciences);
diallyldimethylammonium chloride, aqueous solution at 65% (Aldrich);
vinylbenzyltrimethylammonium chloride, 99% (Aldrich);
benzyldimethylhexadecylammonium chloride, 97% (Acros);
sodium p-dodecylsulfate, 99% (Aldrich);
Tween 60 (Fluka);
hexadecane, 98% (Fluka);
pentanol, 98% (Fluka);
potassium persulfate, 99% (Fluka).

N-dodecylacrilamide and N,N-dihexylacrylamide were prepared following a procedure described in literature (C. L. McCormick, T. Nonaka, C. B. Johnson, *Water-soluble copolymers: Synthesis and aqueous solution behaviour of associative acrylamide/N-alkylacrylamide copolymer*, Polymer, 29, 731 (1988)).

EXAMPLE 1

The polymerization reactions were carried out in a 1 liter glass reactor equipped with a mechanical stirrer.

The head of the reactor has four inlets, used for the insertion of a thermometer, for connection to the vacuum-nitrogen system and for the introduction of the reagents.

The reactor is subjected to three vacuum-nitrogen cycles after which 200 ml of deionized and deaerated water are introduced in an inert atmosphere. 8.45 g (119 mmoles) of acrylamide are added and nitrogen is bubbled into the solution for a further 20 minutes. 2.8 g (6 mmoles) of a 50% aqueous solution 2-methacrylamidopropyltrimethylammonium chloride, 304 mg (1.27 mmoles) of dodecylacrylamide and 15.08 g (38.1 mmoles) of benzyldimethylhexadecylammonium chloride dissolved in 60 ml of deaerated water are subsequently introduced. An opalescent solution is obtained. The reactor is then immersed in a silicon oil bath at 65° C. The temperature inside the reactor rises over a period of 30 minutes and reaches 55° C., where the reaction mixture becomes a homogeneous, transparent solution. At this point, 35 mg (129 μmoles) of potassium persulfate dissolved in 20 ml of deaerated water are added. The reaction is continued for 5 hours under vigorous stirring.

At the end, the reaction mixture (which proves to be viscous and foamy) is poured into a beaker containing 1 liter of acetone maintained under magnetic stirring. The coagulated product is in the form of a white-coloured spongy solid. The polymer is extracted from the beaker, washed with acetone, ground and soaked overnight in a beaker with 200 ml of acetone. After filtration, the polymer was dried in an oven at 65° C. for 18 hours.

EXAMPLE 2

The procedure of Example 1 was repeated using
250 ml of deionized and degassed water;
7.98 g (112.4 mmoles) of acrylamide;
5.57 g of a 50% aqueous solution (12.6 mmoles) of methacrylamidopropyltrimethylammonium chloride;
302 mg (1.26 mmoles) di N-dodecylacrylamide dispersed in:
10 g of Tween 60
6 ml of pentanol
600 mg of hexadecane
50 mg (180 μmoles) of potassium persulfate dissolved in 20 ml of deaerated water.

EXAMPLE 3

The procedure of Example 1 was repeated using
250 ml of deionized and degassed water;
8.33 g (117.4 mmoles) of acrylamide;

6.31 g of a 50% aqueous solution (6.3 mmoles) of 2-methacrylamidopropyltrimethylammonium chloride;
603 mg (2.52 mmoles) di N-dodecylacrylamide dispersed in:
20 g of Tween 60
12 ml of pentanol
1.2 g of hexadecane
50 mg (180 µmoles) of potassium persulfate dissolved in 20 ml of deaerated water.

EXAMPLE 4

The procedure of Example 1 was repeated using
300 ml of deionized and degassed water;
8.45 g (119 mmoles) of acrylamide;
2.8 g of a 50% aqueous solution (6 mmoles) of 2-methacrylamidopropyltrimethylammonium chloride;
304 mg (1.27 mmoles) di N-dodecylacrylamide dispersed in:
10 g of Tween 60
6 ml of pentanol
600 mg of hexadecane
35 mg (128 µmoles) of potassium persulfate dissolved in 20 ml of deaerated water.

EXAMPLE 5

The procedure of Example 1 was repeated using
280 ml of deionized and degassed water;
8.45 g (119 mmoles) of acrylamide;
2.8 g of a 50% aqueous solution (6 mmoles) of methacrylamidepropyltrimethylammonium chloride;
301 mg (1.27 mmoles) di N,N-dihexylacrylamide;
15.07 g (38.1 mmoles) of benzyldimethylhexadecylammonium chloride dissolved in 60 ml of deaerated water;
35 mg (128 µmoles) of potassium persulfate dissolved in 30 ml of deaerated water.

EXAMPLE 6

The procedure of Example 1 was repeated using
300 ml of deionized and degassed water;
8.45 g (119 mmoles) of acrylamide;
1.49 g of a 65% aqueous solution (6 mmoles) of diallyldimethylammonium chloride;
304 mg (1.27 mmoles) di N-dodecylacrylamide dispersed in:
10 g of Tween 60
6 ml of pentanol
600 mg of hexadecane
35 mg (128 µmoles) of potassium persulfate dissolved in 20 ml of deaerated water.

EXAMPLE 7

The procedure of Example 1 was repeated using
250 ml of deionized and degassed water;
7.98 g (112.4 mmoles) of acrylamide;
3.14 g of a 65% aqueous solution (12.6 mmoles) of diallyldimethylammonium chloride;
302 mg (1.27 mmoles) di N-dodecylacrylamide dispersed in:
10 g of Tween 60
6 ml of pentanol
600 mg of hexadecane
50 mg (180 µmoles) of potassium persulfate dissolved in 30 ml of deaerated water.

EXAMPLE 8

The procedure of Example 1 was repeated using
300 ml of deionized and degassed water;
7.89 g (111.1 mmoles) of acrylamide;
3.14 g of a 65% aqueous solution (12.6 mmoles) of diallyldimethylammonium chloride;
604 mg (2.52 mmoles) di N-dodecylacrylamide dispersed in:
20 g of Tween 60
12 ml of pentanol
1.2 g of hexadecane
35 mg (128 µmoles) of potassium persulfate dissolved in 25 ml of deaerated water.

EXAMPLE 9

The procedure of Example 1 was repeated using
300 ml of deionized and degassed water;
8.45 g (119 mmoles) of acrylamide;
1.49 g of a 65% aqueous solution (6 mmoles) of diallyldimethylammonium chloride;
304 mg (1.27 mmoles) di N,N-dihexylacrylamide dispersed in:
10 g of Tween 60
6 ml of pentanol
600 mg of hexadecane
35 mg (128 µmoles) of potassium persulfate dissolved in 25 ml of deaerated water.

EXAMPLE 10

The procedure of Example 1 was repeated adopting a 250 ml reactor and using
50 ml of deionized and degassed water;
3.33 g (47 mmoles) of acrylamide;
527 mg (2.5 mmoles) of vinylbenzyltrimethylammonium chloride;
119 mg (0.5 mmoles) di N-dodecylacrylamide;
5.35 g (13.5 mmoles) of benzyldimethylhexadecylammonium chloride;
16 mg (60 µmoles) of potassium persulfate dissolved in 10 ml of deaerated water.

EXAMPLE 11

The procedure of Example 1 was repeated adopting a 250 ml reactor and using
50 ml of deionized and degassed water;
3.34 g (47 mmoles) of acrylamide;
529 mg (2.5 mmoles) of vinylbenzyltrimethylammonium chloride;
119 mg (0.5 mmoles) di N-dodecylacrylamide dispersed in:
4.7 g of Tween 60
2.8 ml of pentanol
295 mg of hexadecane
16 mg (60 µmoles) of potassium persulfate dissolved in 10 ml of deaerated water.

The performances of the above-mentioned polymers as permeability modifiers relating to water in rocks with a medium-high permeability were tested by means of:
absorption on quartzite and
flushing on rocks with a medium-high permeability.

EXAMPLE 12

Absorption on Quartzite 10 cm³ of the polymer solution in brine (aqueous solution of NaCl at 2%) at a concentration of 2,000 ppm, and 5 g of quartzite in powder form, were charged into a phial with a hermetic closure.

The mixture was stirred by means of a shaker for 24 hours at 40° C. At the end of the suspension it was centrifuged and the liquid phase collected.

The quantity of polymer absorbed on the surface of the quartzite was determined by difference between the initial charge and the polymer still present in solution measured by means of TOC (Total Organic Carbon).

COMPARATIVE EXAMPLE 1

The test of Example 12 was repeated using a copolymer of acrylamide and vinylbenzyltrimethylammonium chloride, lacking of hydrophobic modifying units. Table 1 below indicates the results.

TABLE 1

| Polymer reference | Polymer formula | Absorption mg/g quarzite |
|---|---|---|
| COMPARATIVE Example 1 | (—CH₂—CH—)ₘ—(CH₂—CH—)ₚ with phenyl-CH₂-N⁺(CH₃)₃ Cl⁻ and C=O NH₂ | 0.7 |
| EXAMPLE 1 | —(CH₂—CH—)ₙ—(CH₂—C(CH₃)—)ₘ—(CH₂—CH—)ₚ with C=O NH-(CH₂)₁₁-CH₃; C=O NH-(CH₂)₃-N⁺(CH₃)₃ Cl⁻; C=O NH₂ | 1.1 |

EXAMPLE 13

After verifying the absorption of the polymers on quartzite, their effectiveness in reducing the water permeability was verified by carrying out the test on a rock core having a medium-high porosity.

In order to determine the pore volume at room temperature, the porous medium was saturated under vacuum using brine (2% NaCl) and was weighed before and after the treatment.

The core was subsequently introduced into a Viton tube and placed in a steel cell (Hassler). A confinement pressure of 20 bar was maintained on the tube in order to avoid the elution of the fluids between the VITON tube and the porous medium.

The polymer solution (1,500 ppm in brine), previously filtered and degassed, was then injected in a quantity equal to 10-20 PV (pore volume), maintaining the flow constant. The polymer in excess which had not been absorbed on the rock surface was then removed by washing the rock with brine.

The variation in permeability which the rock has undergone due to the effect of the polymer is determined through measuring the pressure drops which are encountered by flushing brine into the rock at variable flowrates.

Table 2 below indicates the results of the flushing test with the polymer of Example 1 at 60° C.

The flow was blocked for 12 hours maintaining the polymeric solution inside the pores, for 12 hours.

TABLE 2

| Treatment | Volume flushed (PV) | Permeability (mDarcy) | RRF | Reduction in permeability (%) |
|---|---|---|---|---|
| Initial | — | 1000 | 1 | — |
| EXAMPLE 1 | 10 | 826 | 1.2 | 17 |
| EXAMPLE 1 | 10 | 772 | 1.3 | 23 |
| EXAMPLE 1 | 10 | 635 | 1.6 | 37 |

RRF represents the ratio between initial permeability and final permeability

PV is the Pore Volume

The invention claimed is:

1. A (meth)acrylamide copolymer of general formula (I):

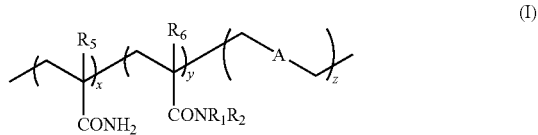

wherein $R_1$ and $R_2$, equal to or different from one another, represent a hydrogen radical or $C_1$-$C_{22}$ alkyl radicals, with the proviso that the sum of the carbon atoms of the two groups $R_1$ and $R_2$ be comprised between 8 and 32; x, y and z represent the percentages of the three units inside the polymeric chain deriving from three comonomers (a), (b) and (c), and wherein y is from 0.05 to 2 and z is from 1 to 30 and x+y+z=100; the unit A represents the copolymer of general formula (I) according to:

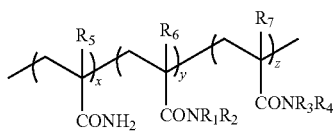

(P1)

where $R_5$, $R_6$ and $R_7$, equal to or different from one another, represent a hydrogen or methyl radical;

$R_3$ and $R_4$, equal to or different from one another, represent a $C_4$-$C_{20}$ hydrocarbon radical, linear or branched, containing a quaternary ammonium group, or one between $R_3$ or $R_4$ has the structure:

where $R_8$ represents a $C_2$-$C_6$, optionally branched, alkylene radical, and $R_9$, $R_{10}$, $R_{11}$, equal to or different from one another, are $C_1$-$C_4$ alkyl radicals; alternatively $R_3$ and $R_4$ are bonded together and form a 6-membered cycle containing a quaternary nitrogen of formula:

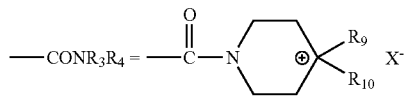

where $R_9$ and $R_{10}$, equal to or different from one another, are $C_1$-$C_4$ alkyl radicals and X is an organic or inorganic monovalent anion chosen between halides, tetrafluoroborate, hexafluorophosphate, methylsulfate, trifluoromethanesulfonate, benzenesulfonate, p-toluenesulfonate, perchlorate and nitrate.

2. A composition comprising the (meth)acrylamide copolymer of claim 1 and a quartzite powder, wherein the (meth)acrylamide copolymer is absorbed on the surface of the quartzite powder.

3. A mixture, comprising:
   the (meth)acrylamide copolymer of claim 1, a brine solution and porous rock.

4. A method for reducing the permeability of a porous medium, comprising:
   contacting an aqueous solution of comprising the (meth) acrylamide copolymer of claim 1 with the porous medium.

5. The method of claim 4, where the porous medium is rock.

\* \* \* \* \*